US007921193B2

(12) United States Patent
Wu et al.

(10) Patent No.: US 7,921,193 B2
(45) Date of Patent: Apr. 5, 2011

(54) SYSTEM AND METHOD FOR LEVERAGING END-USERS' PREFERENCES FOR EFFICIENT COMMUNICATIONS

(75) Inventors: Fuming Wu, Frisco, TX (US); Aziz Mohammed, Plano, TX (US); Alexander Audu, Garland, TX (US)

(73) Assignee: Alcatel Lucent, Paris (FR)

( * ) Notice: Subject to any disclaimer, the term of this patent is extended or adjusted under 35 U.S.C. 154(b) by 1936 days.

(21) Appl. No.: 10/967,385

(22) Filed: Oct. 16, 2004

(65) Prior Publication Data
US 2006/0095560 A1 May 4, 2006

(51) Int. Cl.
G06F 15/173 (2006.01)
G06F 15/167 (2006.01)

(52) U.S. Cl. ........................................ 709/223; 709/215
(58) Field of Classification Search .................. 709/215, 709/223
See application file for complete search history.

(56) References Cited

U.S. PATENT DOCUMENTS

| 2002/0076025 A1* | 6/2002 | Liversidge et al. ...... 379/202.01 |
| 2002/0078150 A1* | 6/2002 | Thompson et al. .......... 709/204 |
| 2003/0065788 A1 | 4/2003 | Salomaki |
| 2003/0185360 A1* | 10/2003 | Moore et al. ............. 379/114.01 |
| 2004/0153506 A1* | 8/2004 | Ito et al. ....................... 709/204 |
| 2005/0034079 A1* | 2/2005 | Gunasekar et al. ........... 715/753 |

FOREIGN PATENT DOCUMENTS
EP 1 549 013 A1 6/2005

OTHER PUBLICATIONS

Khartabil, et al.; Requirements for Presence Specific Event Notification Filtering; IETF Internet Draft; Simple Working Group; Aug. 14, 2003; pp. 1-12.
Khartabil, et al.; Event Notification Filtering for Presence; IETF Internet Draft; SIP; Jan. 2002; pp. 1-19.
Rosenberg, et al.; Caller Preferences for the Session Initiation Protocol (SIP); IETF; Network Working Group; RFC 3841; Aug. 2004; pp. 1-26.
M. Lonnfors et al. "User agent capability presence status extension", drail-lonnfors-simple-prescaps-ext-02, Oct. 2003, pp. 1-21.
J. Rosenberg et at "Indicating User Agent Capabilities in the Session Initiation Protocol (SIP)", draft-ietf-sip-callee-caps-01, Oct. 22, 2003, pp. 1-41.
J. Rosenberg et al. "Caller Preferences for the Session Initiation Protocol (SIP)", draft-ietf-sip-callerprefs-10, Oct. 22, 2003, pp. 1-34.

* cited by examiner

Primary Examiner — Kenny S Lin
Assistant Examiner — Gerald Smarth
(74) Attorney, Agent, or Firm — Capitol Patent & Trademark Law Firm, PLLC

(57) ABSTRACT

A presence server is described herein that implements a method which processes and integrates a presence watcher's communication preferences and a presentity's communication preferences and then distributes the integrated communication preferences along with the presentity's presence information so that the presence watcher can use this information to make a decision on how to contact the presentity. In this way, the presence watcher can achieve promoted communication satisfaction because they know now if they can contact the presentity using their preferred language/device (media type)/security mode (protocol). This enhancement of the communication satisfaction is possible because the integrated communication preferences provided to a presence watcher reflects not only the presentity's communication preferences but also the presence watcher's communication preferences.

14 Claims, 1 Drawing Sheet

SYSTEM AND METHOD FOR LEVERAGING END-USERS' PREFERENCES FOR EFFICIENT COMMUNICATIONS

BACKGROUND OF THE INVENTION

1. Field of the Invention

The present invention relates in general to a presence-based interactive communications system and, in particular, to a presence server and method that can process and integrate the communication preferences of both a presence watcher (or, caller) and a presentity (or, callee) and then distribute the integrated communication preferences to the presence watcher so the presence watcher can make a decision on how to contact the presentity.

2. Description of Related Art

The main function of a presence-based interactive communications system is to improve communications between a presence watcher (or, caller) and a presentity (or, callee). In such a system, the communication efficiency for a specific presence watcher (or, caller) in contacting a specific presentity (or, callee) depends on how much the presence watcher knows about the real-time status of the presentity. For example, the presence watcher may like to know the following information prior to contacting the presentity:

Presence Information:
Availability: Is the presentity available to be contacted?
Activity: What is the current activity of the presentity?
Local Time: Is this the right time to contact to the presentity?
Devices/Media Types: How I can reach the presentity?
More . . . .
Communication Preferences:
What is the presentity's preferred language?
What is the presentity's preferred device?
What is the presentity's preferred security mode/protocol?

The presence watcher is also likely to have their own communication preferences. As such, the presence watcher may also like to know the following information:

Can I contact the presentity using my preferred language/device (media type)/security mode (protocol)?

Unfortunately in the traditional presence-based interactive communications system, the presence watcher has no way to get an answer to this last question besides expressing their communication preferences when they send a request to the presentity. This can result in a rejection from the presentity. For a detailed discussion about the traditional presence-based interactive communications system reference is made to the following documents:

Lonnfors, M. et al. "User agent capability presence status extension", draft-lonnfors-simple-prescaps-ext-02 (work in progress), October 2003.
Rosenberg, J. et al. "Indicating User Agent Capabilities in the Session Initiation Protocol (SIP)", draft-ietf-sip-callee-caps-01 (work in progress), Oct. 22, 2003.
Rosenberg, J. et al. "Caller Preferences for the Session Initiation Protocol (SIP)", draft-ietf-sip-callerprefs-10 (work in progress), Oct. 22, 2003.

The contents of these documents are incorporated by reference herein.

As can be seen, the current practice of traditional presence-based interactive communications services is callee-centric: presentities can publish (as a portion of presence information) their communication preferences to their presence watchers and these communications preferences provide value to the presence watchers in making decisions on how the presentity can be contacted. However, no presence-based method exists today that can leverage the communications preferences of the presence watcher such that the communication preferences of the presence watcher are also taken into account along with the communication preferences of the presentity. The lack of such a presence-based method can result in degraded communications satisfaction for the presence watcher. This problem is solved by the present invention.

BRIEF DESCRIPTION OF THE INVENTION

The present invention includes a presence server that implements a method which processes and integrates a presence watcher's communication preferences and a presentity's communication preferences and then distributes the integrated communication preferences along with the presentity's presence information so that the presence watcher can use this information to make a decision on how to contact the presentity. In this way, the presence watcher can achieve promoted communication satisfaction because they know now if they can contact the presentity using their preferred language/device (media type)/security mode (protocol). This enhancement of the communication satisfaction is possible because the integrated communication preferences provided to a presence watcher reflects not only the presentity's communication preferences but also the presence watcher's communication preferences.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1:
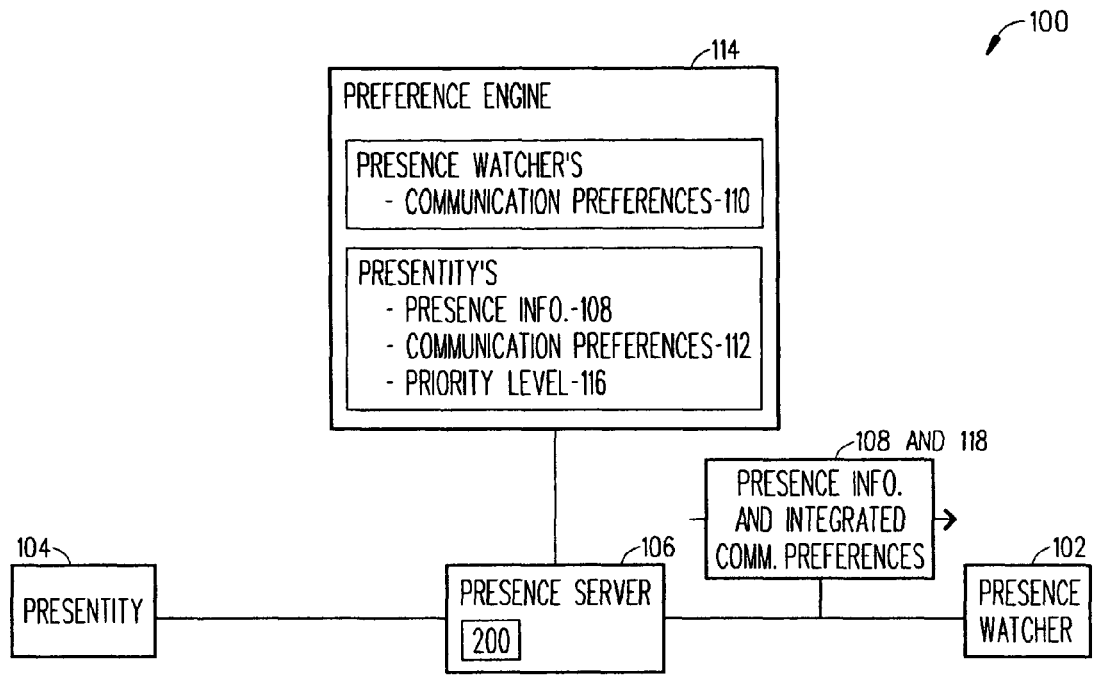
FIG. 1 is a block diagram illustrating the basic components of a presence system that includes a presence server which implements a method for leveraging the communications preferences of a presentity and his/her presence watcher in accordance with the present invention.

Referring to FIG. 1, there is illustrated a presence system 100 that is configured in accordance with the present invention to improve the communications between a presence watcher/caller 102 (only one shown) and a presentity/callee 104 (only one shown). The presence system 100 includes a presence server 106 which distributes presence/communication information 108 and 118 to the presence watcher 102. For instance, the presence/communication information 108 and 118 can be used to notify the presence watcher 102 (e.g., team leader 102) about the status of communication devices like a phone and/or a computer used by the presentity 104 (e.g., team member 104). As such, the presence watcher 102 can tell if the presentity 104 is currently working on their computer or talking on their phone before trying to contact that person 104.

As can be readily understood, the communication efficiency for the presence watcher 102 in contacting the presentity 104 depends on how much the presence watcher 102 knows about the real-time status of the presentity 104. For instance, the presence watcher 102 in the past could obtain only the following information 108 and 112 prior to contacting the presentity 104:

Presence Information 108:
Availability: Is the presentity 104 available to be contacted?
Activity: What is the current activity of the presentity 104?
Local Time: Is this the right time to contact to the presentity 104?
Devices/Media Types: How I can reach the presentity 104?
For instance, does the presentity 104 have access to: (1) a desktop computer (e.g., email, soft VoIP, Instant Messaging (IM)); (2) cell phone; (3) Personal Digital Assistant (PDA)(e.g., IM, Short Message Service (SMS), multimedia) etc. . . .
More . . . .
Communication Preferences 112:
What is the preferred language of the presentity 104?
What is the preferred device of the presentity 104?
What is the preferred security mode/protocol of the presentity 104?

Before the presence watchers 102 are able to receive any of this information 108 and 112 they need to subscribe with the presence server 106 to indicate that they want to obtain the presentity's information 108 and 112. However, as described above, the presence watcher 102 would receive only the presence information 108 and the communication preferences 112 of the presentity 104. The presence watcher 102 would not receive communication information that took into account their own communication preferences 110 along with the communication preferences 112 of the presentity 104. This situation can result in degraded communications satisfaction for the presence watcher 102.

Figure 2:
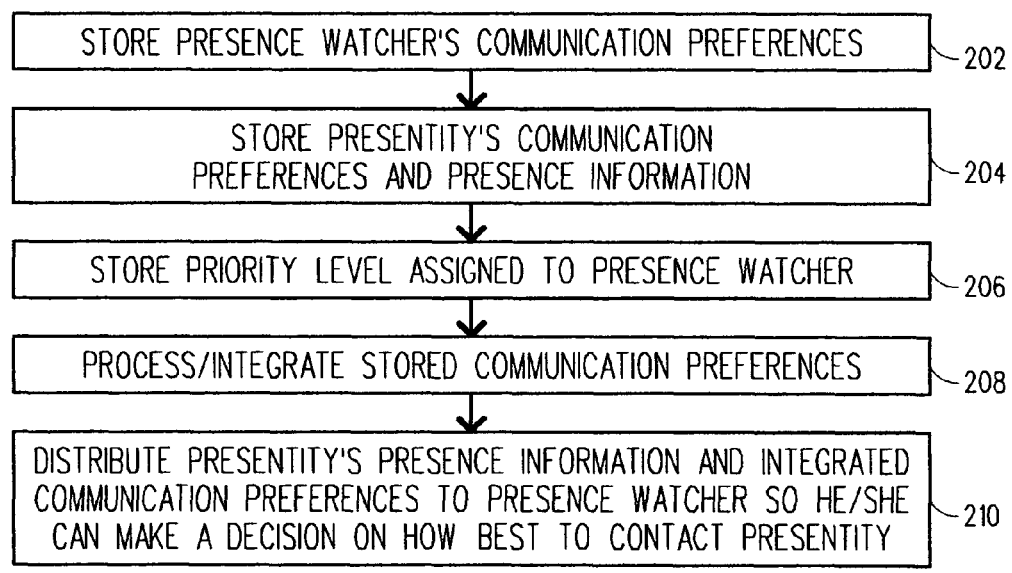
FIG. 2 is a flowchart of the basic steps of the method for leveraging the communications preferences of the presentity and the presence watcher in accordance with the present invention.

Fortunately, this problem is solved by the method 200 of the present invention. As described in more detail below with respect to FIG. 2, the method 200 basically processes and integrates the presence watcher's communication preferences 110 and the presentity's communication preferences 112 and then distributes the integrated communication preferences 118 along with the presentity's other presence information 108 so that the presence watcher 102 can use this information 108 and 118 to make a decision on how to contact the presentity 104. In this way, the presence watcher 102 can achieve promoted communication satisfaction because they know now if they can contact the presentity 104 using their preferred language/device (media type)/security mode (protocol). This enhancement of the communication satisfaction is possible because the integrated communication preferences 118 provided to a presence watcher 102 reflects not only the presentity's communication preferences 112 but also the presence watcher's communication preferences 110.

In the preferred embodiment, the method 200 which is implemented by the presence server 106 operates to store (step 202) the communication preferences 110 associated with the presence watcher 102 in either a preference engine 114 (as shown) or the presence server 106. The communication preferences 112 along with the presence information 108 that are associated with the presentity 104 are also stored (step 204) in either the preference engine 114 (as shown) or the presence server 106. However, prior to or during the performance of steps 202 and 204, the presence watcher 102 and the presentity 104 have to configure their communications preferences 110 and 112, i.e., language preferences, device preferences and security preferences, by assigning each of them q-values. A q-value is a numeric value in the unit interval [0, 1].

For instance, the presentity 104 can input a q-value of 0 which represents that there is no way to let the presence watcher 102 use the corresponding language/device (or media type)/security protocol (mode), while a q-value of 1 indicates the corresponding language/device (media type)/security protocol is the preferred one. The presentity 104 can also input a q-value that is somewhere between 0 and 1 like 0.8 which represents that the corresponding language/device (or media type)/security protocol (mode) is not the most preferred one but they can definitely use it. The presence watcher 102 inputs q-values in the same manner for each of their languages/devices (or media types)/security protocols (modes). In an alternative embodiment, the presence watcher 102 and the presentity 104 can use a sliding scale to input or modify the q-values for their communication preferences 110 and 112 instead of inputting a numeric value between 0 to 1. A detailed description about how q-values can be assigned to the presence watcher's communication preferences 110 and the presentity's communication preferences 112 is provided below with respect to Example #1.

The presentity 104 also needs to assign (step 206) a priority level 116 to the presence watcher 102. The priority level 116 is stored along with the presentity's communication preferences 112 in a database located in either the preference engine 114 (as shown) or the presence server 106. The priority level 116 (recommended data type: integer) reflects the presentity's view of the importance of the presence watcher 102. As described in greater detail below, the smaller the priority level 116, then the more the presentity 104 will consider the presence watcher's communication preferences 110. The presentity 104 can change at any time the priority level 116 of the presence watcher 102.

The priority level 116 may or may not tie to the access policies of the presentity's presence information 108. If the priority level 116 is tied to the access policies, then the presentity 104 does not need to grant an access degree for each of their attributes in the presence information 108. Instead, the presentity 104 can simply assign a priority level 116 to the presence watcher 102 that is predefined to indicate what presence information 108 can be accessed by that presence watcher 102. Like above, if the presence watcher 102 is assigned a small priority level 116 then the presence watcher 102 can have more access to the presentity's preference information 108. The priority level 116 is generally hidden from the presence watcher 102 and is stored in a policy database of the presence server 106 or in a database of the preference engine 114 (as shown).

The presence server 106 then processes and integrates (step 208) the stored communication preferences 110 associated with the presence watcher 102 and the stored communication preferences 112 associated with the presentity 104. This integration or leveraging of the presence watcher's communications preferences 110 makes it possible to have the communication preferences 110 of the presence watcher 102 taken into account along with the communication preferences 112 of the presentity 104. As will be described in more detail below, the presence watcher 102 can use the integrated communication preference data 118 to make a decision on how to contact the presentity 104.

To integrate the communication preferences 110 and 112, the presence server 106 first configures a weight function $w_\tau$ for each $\tau \in$ {language, device/media type, security} associated with the communication preferences 112 of the presentity 104. In the preferred embodiment, the weight function $w_\tau$ is defined as follows:

$$w_\tau(x) = 1 - x/\text{maxLevel}, \forall x \in \{0, \ldots, \text{maxLevel}\}$$

where x is the priority level 116 and "maxLevel" is the highest priority level the presentity has been granted to his/her presence watchers 102. For example, the presentity 104 has assigned the presence watcher 102 a priority level of 2 out of 5 levels (0 . . . 4) which means that $w_\tau(x)=1-2/4$ or 0.5. After all of the weight functions $w_\tau(x)$ are defined, the presence server 106 then implements the training (convex) function to process all of the q-values and the weight functions $w_\tau(x)$ to determine the integrated communication preferences 118. How this is done is described next.

First, suppose $S_\tau=\{\tau_1, \tau_2, \ldots, \tau_n\}$ represents all the types of $\tau \in$ {language, device/media type, security} that are supported by the presentity 104. And, the communication preferences 112 of the presentity 104 can be represented as follows:

$$\tau_1;q(p,\tau_1), \tau_2;q(p,\tau_2), \ldots, \tau_n;q(p,\tau_n),$$

where $q(p, \tau_i)$ is the q-value indicating the preference of the presentity 104 to the type $\tau_i$ for i=1, . . . , n.

The following indicates the communication preferences 110 of the presence watcher 102 with regards to $S_\tau$:

$$\tau_1;q(w,\tau_1), \tau_2;q(w,\tau_2), \ldots, \tau_n;q(w,\tau_n)$$

where $q(w, \tau_i)$ is the q-value indicating the preference of the presence watcher 102 to the type $\tau_i$ for i=1, . . . , n.

Then, for i=1, . . . , n, the new q-values of the presentity 104 can be defined as:

$$q'(p, w, \tau_i) = \begin{cases} (1 - W_\tau(\rho(w))) \times q(p, \tau_i) + W_\tau(\rho(w)) \times q(w, \tau_i), \\ \qquad \text{if } q(p, \tau_i) \times q(w, \tau_i) \neq 0; \\ \text{otherwise } 0. \end{cases}$$

where $\rho(w)$ is the priority level of the current presence watcher w.

These new q-values $q'(p,w,\tau_i)$ reflect the presentity's considerations of the communication preferences 110 of the presence watcher 102. In the preferred embodiment, the new q-values $q'(p,w,\tau_i)$ are sorted in decreasing order based on types $\tau_1, \tau_2, \ldots, \tau_n$ and then distributed (step 210) as the integrated communication preferences 118 to the presence watcher 102. At this time, the appropriate presence information 108 is also published to the presence watcher 102.

As can be seen in the training function, the weight function $w_\tau$ is important in that it 'linearly' reflects the priority level 116 assigned to the presence watcher 102 which has an impact on how much the presentity 104 will take into account the presence watcher's communication preferences 110. For instance, if the weight function $w_\tau$ is as follows:

$$w_\tau(x)\equiv 0, \forall x \in \{0, \ldots, \text{maxLevel}\}$$

then this indicates that the integrated communication preferences 118 ($q'(p,w,\tau_i)$) that are distributed (step 210) to the presence watcher 102 are going to be the same as the presentity's communication preferences 112. Because, the presentity 104 will not take into account any of the presence watcher's communications preferences 110.

In contrast, if the weight function $w_\tau$ is as follows:

$$w_\tau(x)\equiv 1, \forall x \in \{0, \ldots, \text{maxLevel}\}$$

then this indicates that the integrated communication preferences 118 ($q'(p,w,\tau_i)$) that are published (step 210) to the presence watcher 102 are going to be the same as the presence watchers' communication preferences 110. Because, in this situation, the presentity 104 is willing to communicate with the presence watcher 102 using the communications preferences 110 chosen by the presence watcher 102.

And, if the weight function $w_\tau(x)$ is somewhere in between 0 and 1, then the integrated communication preferences 118 ($q'(p,w,\tau_i)$) that are distributed (step 210) to the presence watcher 102 are going to indicate in varying degrees both the presence watcher's communication preferences 110 and the presentity's communication preferences 112. As such, regardless of the value of the weight function $w_\tau(x)$, the presence watcher 102 can still use the integrated communication preferences 118 to make a decision on how to contact the presentity 104. It should be appreciated that the integrated communication preferences 118 may be displayed to the presence watcher 102 in the form of a sliding scale to aid in the viewing and understanding of the information.

Described next are three examples of how the method 200 of the present invention can be implemented to enhance the communications satisfaction of the presence watcher 102.

In the first example, an employee (presentity 104) provides privileges to their manager (presence watcher 102) such that when a communication session is initiated then the manager's communications preferences 110, such as, language, device/media and/or security are taken into account. In this example, suppose the employee 104 grants a priority level 0 out of 5 levels (0 . . . 4) to their manager 102 at the time the manager 102 subscribes with the presence server 106 so they can be notified about the presence of the employee 102. This means that the weight function $w_\tau(x)$ equals 1.

Assuming the manager 102 has configured their communication preferences 110 and q-values as follows:
Language: Chinese (0.0); English (0.8); French (0.2); Spanish (0.6).
Media: Voice (1.0); Text (0.5); Multimedia (0.4)
And, the employee 104 has configured their communication preferences 112 and q-values as follows:
Language: Chinese (0.8); English (0.5); French (0.1); Spanish (0.0).
Media: Voice (0.5); Text (0.9); Multimedia (0.7)

Then, after processing all of this information and implementing the training function (step 208), the integrated communication preferences 118 that are displayed to the manager 104 would be as follows:
Language: English (preferred); French.
Media: Voice (preferred); Text; Multimedia.

To obtain the language information, the training function would compute $q'(p,w,\tau_i)$ where $\tau_i$ is language as follows:
Chinese: 0.0 (since q(w, Chinese)=0.0)
English: [1−(1−0/4)]*0.5+(1−0/4)*0.8=0.8
French: [1−(1−0/4)]*0.1+(1−0/4)*0.2=0.2
Spanish: 0.0 (since q(p, Spanish)=0.0)

And, to obtain the media information, the training function would compute $q'(p,w,\tau_i)$ where $\tau_i$ is media as follows:
Text: [1−(1−0/4)]*0.9+(1−0/4)*0.5=0.5
Voice: [1−(1−0/4)]*0.5+(1−0/4)*1.0=1.0
Multimedia: [1−(1−0/4)]*0.7+(1−0/4)*0.4=0.4

As can be seen, the displayed communication preferences 118 reflects exactly the communications preferences 110 of the manager 102 (presence watcher 102). This is because the weight function $w_\tau(x)$ was 1 when the training function was implemented. It can also be seen that the displayed preference information 108 indicates to the manager 102 what the employee 104 (presentity 104) is not capable, for example, the employee 104 doesn't know Spanish at all.

For purposes of comparison, assume the training function (step 208) of the present invention was not implemented, then the employee's presence information 112 that would be displayed to the manager 104 using the traditional presence-based method follows:
Language: Chinese (preferred); English; French.
Media: Text (preferred); Multimedia; Voice.

In the second example, an employee (presentity 104) provides privileges to their manager/colleague (presence watcher 102) such that when a communication session is initiated then the manager's communications preferences 110, such as, language, device/media and/or security are taken into account. In this example, suppose the employee 104 grants a priority level 5 out of 9 levels (0 . . . 8) to a colleague 102 at the time the colleague 102 subscribes with the presence server 106 so they can be notified about the presence of the employee 102. This means that the weight function $w_\tau(x)$ equals 0.375.

Assuming the colleague 102 has configured their communication preferences 110 and q-values as follows:
 Language: Chinese (0.0); English (0.8); French (0.2); Spanish (0.6).
 Media: Voice (1.0); Text (0.5); Multimedia (0.4)

And, the employee 104 has configured their communication preferences 112 and q-values as follows:
 Language: Chinese (0.8); English (0.5); French (0.1); Spanish (0.0).
 Media: Voice (0.5); Text (0.9); Multimedia (0.7)

Then, after processing all of this information and implementing the training function (step 208), the integrated communication preferences 118 that are displayed to the manager 104 would be as follows:
 Language: English (preferred); French.
 Media: Text (preferred); Voice; Multimedia.

To obtain the language information, the training function would compute $q'(p,w,\tau_i)$ where $\tau_i$ is language as follows:
 Chinese: 0.0 (since q(w, Chinese) 0.0)
 English: $[1-(1-5/8)]*0.5+(1-5/8)*0.8=0.5425$
 French: $[1-(1-5/8)]*0.1+(1-5/8)*0.2=0.1375$
 Spanish: 0.0 (since q(p, Spanish)=0.0)

And, to obtain the media information, the training function would compute $q'(p,w,\tau_i)$ where $\tau_i$ is media as follows:
 Text: $[1-(1-5/8)]*0.9+(1-5/8)*0.5=0.75$
 Voice: $[1-(1-5/8)]*0.5+(1-5/8)*1.0=0.6875$
 Multimedia: $[1-(1-5/8)]*0.7+(1-5/8)*0.4=0.5875$ As can be seen, the displayed communication preferences 118 reflects neither the communications preferences 110 of the colleague 102 (presence watcher 102) nor the communications preferences 110 of the employee 104 (presentity 104). This is because the weight function $w_\tau(x)$ was 0.375 when the training function was implemented. It can also be seen that the displayed preference information 108 indicates to the colleague 102 what the employee 104 is not capable, for example, the employee 104 doesn't know Spanish at all.

Again, for purposes of comparison, assume the training function (step 208) of the present invention was not implemented, then the employee's presence information 112 that would be displayed to the manager 104 using the traditional presence-based method follows:
 Language: Chinese (preferred); English; French.
 Media: Text (preferred); Multimedia; Voice.

In the third example, the training function is used in a customer service application. It is well known that a customer is usually treated in a manner depending on their importance. For instance, a higher priority customer is usually going to receive more professional services than a lower priority customer. This fact lead to the idea of assigning a priority level 116 to a customer 102 (presence watcher 102) and then using the aforementioned training function of the present invention to process customer service information.

In an exemplary scenario, a call center might dynamically select the priority level of a customer 102 based on certain criteria (e.g., day-to-day orders, Platinum Customer, Gold Customer, Corporate Customer, Key Customer . . . ). The higher-value (higher-dollar) customer 102 would generally be granted a lower priority level 116. And, a call from the higher-value customer 102 would receive enhanced professional services which can be accomplished by using the assigned priority level 116 to leverage the customer's communications preferences 110 in accordance with the training function. As a result, the higher value customer 102 would have more communications channels and more flexibility to decide their communications methods like, languages, media types and so on when they communicate with the call center.

The call center could also categorize their customer service representatives (presentities 104) into groups based on working experience, service skills (e.g., technical skills, language skills and/or management skills for decision making, etc.). Then, each group of customer service representative's 104 might be chosen to service customers 102 that have been assigned a particular priority level 116. For example, the most experienced customer service representatives' group 104 would service the most valuable customers 102. And, these customer service representatives 104 would be equipped with the most advanced communication devices and/or support more communications means (or, media types) when compared to other groups of customer service representatives 104. In this way, the high-value customers 102 would have more options to communicate with the customer service representative 104 after the training function is implemented.

Following are some features, advantages and uses of the present invention:
 The present invention improves communication efficiency for presence watchers 102 (customers, callers) satisfaction.
 The present invention enables communications driven by the presentity's communication preferences 112 with sufficient considerations given to presence watchers' communication preferences 110 according to a priority scheme assigned to the presence watchers 102.
 The present invention can reduce the display space used to display the integrated communications preferences 118 (languages, devices/media types, security protocols). Because, only the capabilities supported by both the presentity 104 and the presence watcher 102 would be displayed to the presence watcher 102.
 The present invention enables the customization of granting privileges to presence watchers 102 depending on their authorized priority levels 116.
 It should be appreciated that many components and details associated with the presence server 106 and preference engine 114 described above are well known in the industry. Therefore, for clarity, the description provided above omitted those well known components and details that are not necessary to understand the present invention.
 It should also be appreciated that the presence system 100 and method 200 can support any number of presentities and presence watchers although only one of each was shown and described herein.

Although one embodiment of the present invention has been illustrated in the accompanying Drawings and described in the foregoing Detailed Description, it should be understood that the invention is not limited to the embodiment disclosed, but is capable of numerous rearrangements, modifications and substitutions without departing from the spirit of the invention as set forth and defined by the following claims.

What is claimed is:
1. A presence system comprising:
 a presence server capable of processing and integrating communication preferences based on,
 a weight function for a particular set of communication preferences and a priority level assigned to a presence watcher by a presentity, a first q value indicating a preference for a particular set of communication preferences associated with the presentity, a second q value indicating a preference for a particular set of communication preferences associated with a presence watcher, and a q' value that reflects the presentity's consideration of the communication preferences for the particular set of communication preferences associated with the presence watcher; and said presence server capable of distributing the processed and integrated communication preferences along with presence information about the presentity to the presence watcher so the presence watcher can use the processed and integrated communication preferences to make a decision on how to contact the presentity.

2. The presence system of claim 1, further comprising a preference engine capable of storing the communication preferences associated with the presentity and also capable of storing the communication preferences associated with the presence watcher.

3. The presence system of claim 1, wherein said presence server is capable of storing the communication preferences associated with the presentity and also capable of storing the communication preferences associated with the presence watcher.

4. The presence system of claim 1, wherein said first q value for the particular set of communication preferences associated with the presentity is a numeric value of 0 to 1, where the numeric value of 0 indicates the presentity cannot use the particular set of communication preferences and the numeric value of 1 indicates that the presentity prefers to use the particular set of communications preferences.

5. The presence system of claim 1, wherein said second q value for the particular set of communication preferences associated with the presence watcher is a numeric value of 0 to 1, where the numeric value of 0 indicates the presence watcher cannot use the particular set of communication preferences and the numeric value of 1 indicates that the presence watcher prefers to use the particular set of communication preferences.

6. The presence system of claim, 1 wherein said presence server distributes the integrated communication preferences in a form of a sliding scale to the presence watcher.

7. The presence system of claim 1, wherein said presence server comprises a call center, customer service application server.

8. The presence system of claim 1, wherein said at least one of said presentity and said presence watcher can modify their respective communication preferences.

9. A method for enabling communication preferences of a presence watcher to be taken into account in a presence-based interactive communications network, said method comprising the steps of:

storing communication preferences associated with the presence watcher;

storing communication preferences associated with a presentity;

storing a priority level assigned by the presentity to the presence watcher;

processing and integrating the stored communication preferences associated with the presentity and the stored communication preferences associated with the presence watcher using, a weight function for a particular set of communication preferences and a priority level assigned to the presence watcher by the presentity;

a first q value indicating a preference for a particular set of communication preferences associated with the presentity;

a second q value indicating a preference for a particular set of communication preferences associated with the presence watcher; and a q' value that reflects the presentity's consideration of the communication preferences for the particular set of communication preferences associated with the presence watcher; and distributing the processed and integrated communication preferences along with presence information about the presentity to the presence watcher so the presence watcher can use the integrated communication preferences to make a decision on how to contact the presentity.

10. The method of claim 9, wherein said first q value for the particular set of communication preferences associated with the presentity is a numeric value of 0 to 1, where the numeric value of 0 indicates the presentity cannot use the particular set of communication preferences and the numeric value of 1 indicates that the presentity prefers to use the particular set of communication preferences.

11. The method of claim 9, wherein said second q value for the particular set of communication preferences associated with the presence watcher is a numeric value of 0 to 1, where the numeric value of 0 indicates the presence watcher cannot use the particular set of communication preferences and the numeric value of 1 indicates that the presence watcher prefers to use the particular set of communication preferences.

12. The method of claim 9, wherein the processed and integrated communication preferences is distributed in a form of a sliding scale to the presence watcher.

13. The method of claim 9, wherein said processing and integrating are completed by a call center.

14. The method of claim 9, wherein said at least one of said presentity and said presence watcher can modify their respective communication preferences.

* * * * *